(12) United States Patent
Bones et al.

(10) Patent No.: US 9,435,903 B2
(45) Date of Patent: Sep. 6, 2016

(54) SYSTEM AND METHOD FOR REGULARIZING SEISMIC DATA

(71) Applicants: Dennis George Bones, Dublin, CA (US); Kendall Bong Hu Louie, Orinda, CA (US); Shoujian Jane Huang, San Ramon, CA (US)

(72) Inventors: Dennis George Bones, Dublin, CA (US); Kendall Bong Hu Louie, Orinda, CA (US); Shoujian Jane Huang, San Ramon, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 531 days.

(21) Appl. No.: 14/051,774

(22) Filed: Oct. 11, 2013

(65) Prior Publication Data

US 2015/0106019 A1   Apr. 16, 2015

(51) Int. Cl.
*G01V 1/30* (2006.01)
*G01V 1/32* (2006.01)

(52) U.S. Cl.
CPC .. *G01V 1/30* (2013.01); *G01V 1/32* (2013.01)

(58) Field of Classification Search
USPC .......................................................... 702/14
See application file for complete search history.

(56) References Cited

U.S. PATENT DOCUMENTS

| | | | |
|---|---|---|---|
| 6,778,909 B1 | 8/2004 | Popovici et al. |
| 7,027,929 B2 | 4/2006 | Wang |
| 7,197,399 B2 | 3/2007 | Matson et al. |
| 7,453,766 B1 | 11/2008 | Padgett |
| 7,505,362 B2 | 3/2009 | Anderson et al. |
| 7,672,195 B2 | 3/2010 | Barnes |
| 7,768,872 B2 | 8/2010 | Kappius et al. |
| 8,265,875 B2 | 9/2012 | Moore |
| 8,335,651 B2 | 12/2012 | Higginbotham et al. |
| 2008/0225642 A1 | 9/2008 | Moore et al. |
| 2009/0037114 A1 | 2/2009 | Peng et al. |
| 2010/0299069 A1 | 11/2010 | Moore |
| 2010/0302904 A1 | 12/2010 | Ferber et al. |
| 2012/0033525 A1 | 2/2012 | Abma et al. |
| 2012/0275268 A1 | 11/2012 | Tang et al. |
| 2013/0128696 A1 | 5/2013 | Vassallo et al. |

(Continued)

FOREIGN PATENT DOCUMENTS

EP    2 103 959    *  9/2009  ............... G01V 1/36
EP    2103 959 A2    9/2009

OTHER PUBLICATIONS

Calculation of Azimuth, Elevation and Polarization for non-horizontal aligned Antennas, 9,6, 2015, 31 pages.*

(Continued)

*Primary Examiner* — Tung Lau
(74) *Attorney, Agent, or Firm* — Marie L. Clapp

(57) ABSTRACT

A system and method for regularizing irregularly sampled 5D seismic data by assigning each trace to a common midpoint bin and mapping each trace to an offset vector tile (OVT) with a calculated center azimuth; assembling an azimuth sector with all offsets of interest and a narrow range of the center azimuths from the OVTs; rotating the azimuth sector to align with an inline direction and a crossline dimension; selecting a subset of traces with a single crossline value to create an irregular 3D volume; regularizing the irregular 3D volume; and repeating as necessary to generate a regularly sampled seismic dataset. The regularization may include interpolation by an algorithm such as an anti-leakage Fourier interpolator. The regularly sampled seismic dataset may be used to characterize the subsurface by further processing such as tomography.

9 Claims, 6 Drawing Sheets

(56) References Cited

U.S. PATENT DOCUMENTS

2013/0253838 A1    9/2013    Tegtmeier-Last et al.
2015/0106019 A1*    4/2015    Bones ................. G01V 1/32
                                                                                                702/14

OTHER PUBLICATIONS 5D interpolation of seismic data with combination of MWNI and POCs algorithm (2013), 3 pages.*
Five Dimensional Seismic Data Interpolation (2009), 4 pages.*
Foorprint attenuation with 5D interpolation, Peter Cary, Nov. 2012, 4 pages.*
Cary et al. Footprint Attenuation with 5D Interpolation Cary et al. 2012.
Pan et al. 5D interpolation of seismic data with combination of MWNI and POC algorithm Pan et al. May 2013.
Trad et al. Five Dimensional Seismic Data Interpolation Trad et al. 2009.
PCT Notification of Transmittal of the International Search Report and the Written Opinion of the International Searching Authority, or the Declaration, Jan. 12, 2015, 12 pages.

* cited by examiner

SYSTEM AND METHOD FOR REGULARIZING SEISMIC DATA

FIELD OF THE INVENTION

The present invention relates generally to methods and systems for processing seismic data and, in particular, methods and systems for regularizing irregularly sampled seismic data.

BACKGROUND OF THE INVENTION

Exploration for and development of hydrocarbon reservoirs may be efficiently done with the help of seismic data, which must be properly processed in order to allow interpretation of subsurface features. Generally, seismic data is acquired by using active seismic sources to inject seismic energy into the subsurface which is then refracted and/or reflected by subsurface features and recorded at seismic receivers.

In many cases, the seismic survey is unable to acquire the data in a perfectly uniform manner, resulting in irregularly sampled data. This may be caused, for example, by obstructions in the survey area, errors in placing sources and receivers, cable feathering in marine acquisitions, and/or the use of non-uniform survey geometries such as coil shooting. These examples are not meant to be limiting; one skilled in the art will be aware that other causes exist.

Some conventional methods for handling irregularly sampled seismic data include flex-binning. These methods may render the seismic data inappropriate for certain types of seismic processing such as tomography.

SUMMARY OF THE INVENTION

Described herein are implementations of various approaches for a computer-implemented method for regularization of seismic data.

A computer-implemented method for regularizing irregularly sampled seismic data, wherein the irregularly sampled seismic data has at least five dimensions including a first spatial dimension, a second spatial dimension, an offset dimension, an azimuth dimension, and a time or depth dimension; each trace of the irregularly sampled seismic dataset is assigned to a representative bin; each of the traces of the irregularly sampled seismic dataset is mapped to an offset vector tile (OVT) with a calculated center azimuth; an azimuth sector with all offsets of interest and a narrow range of the center azimuths from the OVTs is assembled; the azimuth sector is rotated from an original orientation to align the first spatial dimension and the second spatial dimension with an inline direction and a crossline dimension determined from a seismic acquisition geometry for the irregularly sampled seismic dataset; a subset of traces is selected from the rotated azimuth sector based on a single crossline value to create an irregular 3D volume; the irregular 3D volume is regularized; the regularizing is repeated for all crossline values to generate a regularly sampled azimuth sector; the regularly sampled azimuth sector is rotated back to the original orientation; and the operations are repeated for each azimuth sector to generate a regularly sampled seismic dataset. The regularization may include interpolation by an algorithm such as an anti-leakage Fourier interpolator. The regularly sampled seismic dataset may be used to characterize the subsurface by further processing such as tomography.

In another embodiment, a computer system including a data source or storage device, at least one computer processor and an user interface used to implement the method for regularizing seismic data is disclosed.

In yet another embodiment, an article of manufacture including a computer readable medium having computer readable code on it, the computer readable code being configured to implement a method for regularizing seismic data is disclosed.

The above summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

These and other features of the present invention will become better understood with regard to the following description, claims and accompanying drawings where:

DETAILED DESCRIPTION OF THE INVENTION

Figure 1:
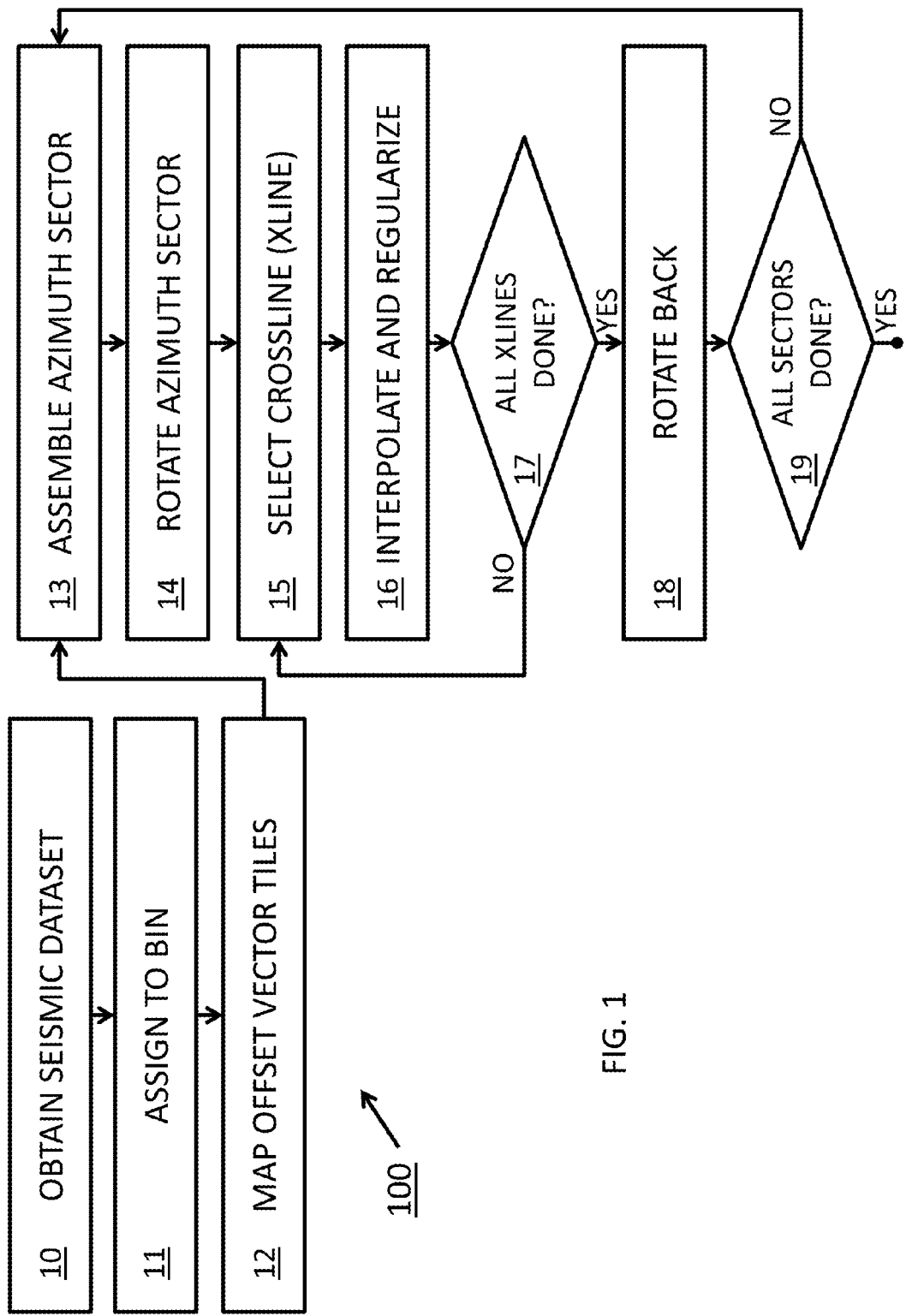
FIG. 1 is a flowchart illustrating a method in accordance with an embodiment of the present invention.

The present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Moreover, those skilled in the art will appreciate that the present invention may be practiced using any one or combination of hardware and software configurations, including but not limited to a system having single and/or multiple processor computers, hand-held devices, tablet devices, programmable consumer electronics, mini-computers, mainframe computers, and the like. The invention may also be practiced in distributed computing environments where tasks are performed by servers or other processing devices that are linked through one or more data communications network. In a distributed computing environment, program modules may be located in both local and remote computer storage media including memory storage devices.

Also, an article of manufacture for use with a computer processor, such as a CD, pre-recorded disk or other equivalent devices, may include a tangible computer program storage medium and program means recorded thereon for directing the computer processor to facilitate the implementation and practice of the present invention. Such devices and articles of manufacture also fall within the spirit and scope of the present invention.

Referring now to the drawings, embodiments of the present invention will be described. The invention can be implemented in numerous ways, including, for example, as a system (including a computer processing system), a method (including a computer implemented method), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

The present invention relates to regularizing seismic data. One embodiment of the present invention is shown as method 100 in FIG. 1. At operation 10, an irregularly sampled seismic dataset is obtained. The input dataset may be arranged and/or preprocessed in a variety of ways. One skilled in the art will appreciate that many arrangements and preprocessing of the dataset are possible and can be used for operation 10. The recordings may be made, for example, by towed streamers, ocean bottom cables, ocean bottom nodes, or land-based sensors such as geophones or accelerometers in any number of receiver array configurations including, for example, 2-D line surveys, 3-D surveys, wide-azimuth and full-azimuth surveys. Active sources may be fired simultaneously or sequentially, in linear source geometries or in alternative geometries such as coil shooting. Combinations of different source or receiver types may be used. Additionally, the seismic dataset may be synthetic data. One skilled in the art will appreciate that there are many ways to generate synthetic seismic data suitable for the seismic dataset. The dataset may include a first spatial dimension (x), a second spatial dimension (y), an offset dimension, an azimuth dimension, and a time or depth dimension, so it is at least 5-dimensional (5D). The spatial dimensions may be related to surface coordinates such as source and receiver locations or subsurface coordinates such as midpoint locations. These examples are not meant to be limiting. Other acquisition geometries and data arrangements fall within the scope of the present invention.

At operation 11 of method 100, each trace in the seismic dataset is assigned to a representative bin such as a common midpoint point (CMP) bin or a common depth point (CDP) bin. The dimensions of the bin are determined, for example, based on the field acquisition geometry. The CMP bins may also be assigned line numbers based on the collection of bins along the in-line and cross-line survey directions.

At operation 12, each trace is mapped to an offset vector tile (OVT). In an embodiment, the OVTs are single-fold subsets of the traces with similar offsets and azimuths. The dimensions of the OVTs may be determined, for example, based on the field acquisition geometry. The mapping may be accomplished by calculating vector offset components (e.g. in-line offset and cross-line offset) for each trace and assigning it to an OVT based on user-specified offset ranges. It is also desirable to calculate a center azimuth for each OVT based on the similar azimuths of the mapped traces, for example, an average of the azimuths of the traces mapped into a particular OVT. A diagram of the mapping operation may be seen in FIG. 2.

Figure 2:
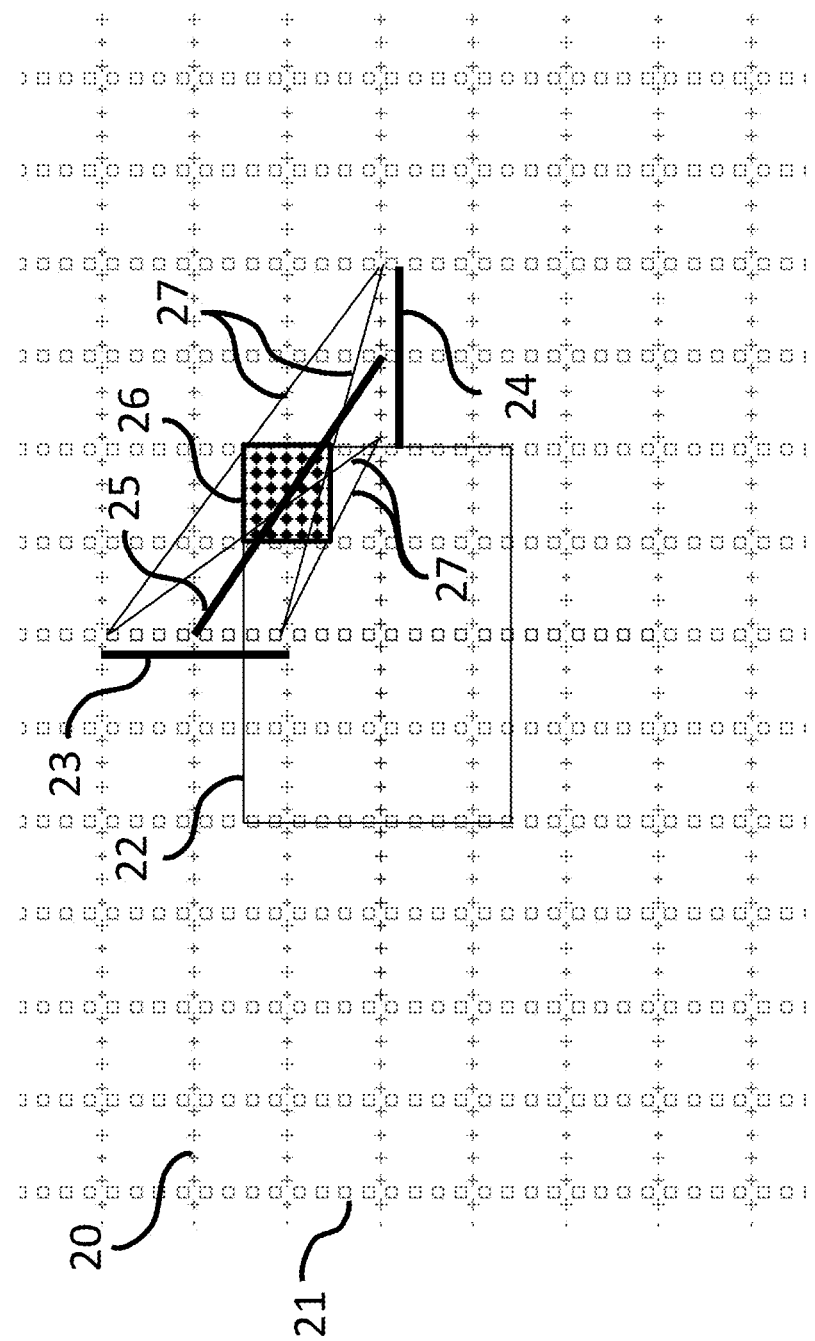
FIG. 2 is an illustration of an operation for mapping seismic traces into an offset vector tile (OVT)

FIG. 2 shows receiver lines 20 as small crosses and source lines 21 as small squares. In this example, the receiver lines 20 and source lines 21 are regularly spaced. In reality, the source and receiver lines are rarely ever as regular as shown here. This example is for illustrative purposes only and is not meant to be limiting. To map traces into OVTs, in a particular area 22, an OVT 26 (shown here as a checkered box) is associated with traces related to a particular section of source line 23 and a particular section of receiver line 24. These traces are based on source-to-receiver geometries 27 which provide offset and azimuth information. The OVT has an average offset vector 25 that is calculated from the offsets and azimuths of the traces included in this OVT. The average offset vector indicates the central azimuth for this OVT.

Figure 3:
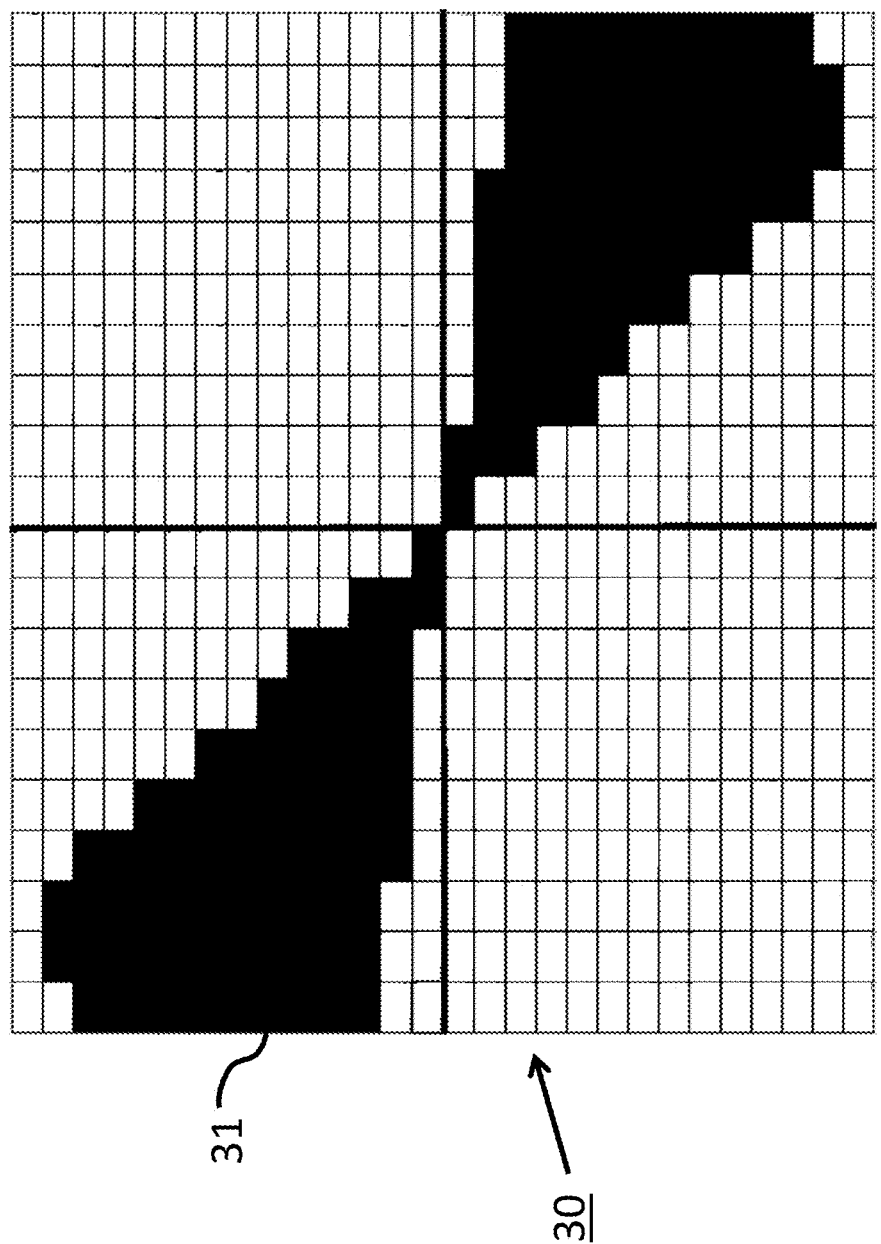
FIG. 3 is an example of an azimuth sector.

Referring again to FIG. 1, operation 13 assembles an azimuth sector. An azimuth sector contains a subset of the OVTs that represent a wide range of offsets but a narrow range of azimuths. In one embodiment, an azimuth sector may include a full range of offsets. A narrow range of azimuths may include azimuths that are within 45 degrees of a given direction. When the range of azimuths is sufficiently narrow, it is possible to assume that the azimuths are essentially the same, reducing the dimensionality of the data by one (e.g. 5D reduced to 4D). An example of an azimuth sector can be seen in FIG. 3 where a set of all available OVTs 30 has an azimuth sector 31 representing all azimuths between 0-45 degrees and its reciprocal 180 to 225 degrees shown in black.

The spatial coordinates of the traces within the azimuth sector may be rotated to align them with the in-line and cross-line directions of the seismic acquisition survey (operation 14). This allows the substitution of in-line and cross-line numbers for x and y spatial coordinates.

After the rotation, a single cross-line of the rotated azimuth sector is selected (operation 15). Due to the rotation, this cross-line will have a narrow range of x dimension values. When the range of x values is sufficiently narrow, it is possible to assume that the x values are essentially the same, again reducing the dimensionality of the data by one (e.g. 4D reduced to 3D), leaving the y and offset dimensions to be regularized.

At operation 16, the single cross-line is regularized, using, for example, a 3D interpolation algorithm. This operation will generate traces that are regularly sampled in y-coordinate & offset for this particular cross line. Those skilled in the art are aware that there are a number of 3D interpolation and regularization algorithms that are useful for interpolating and regularizing seismic data, such as an anti-leakage Fourier interpolator. This example is not meant to be limiting. Other algorithms may be used. This operation will generate a regularly sampled cross-line.

At operation 17, it is determined if all of the cross-lines in the azimuth sector have been regularized. If not, operations 15 and 16 are repeated. Once all of the cross-lines in the azimuth sector have been regularized, the resultant regularized azimuth sector is rotated back to its original orientation at operation 18.

At operation 19, it is determined if all of the azimuth sectors of interest have been regularized. If not, operations 13 through 18 are repeated until the entire dataset of interest has been regularized.

Figure 4:
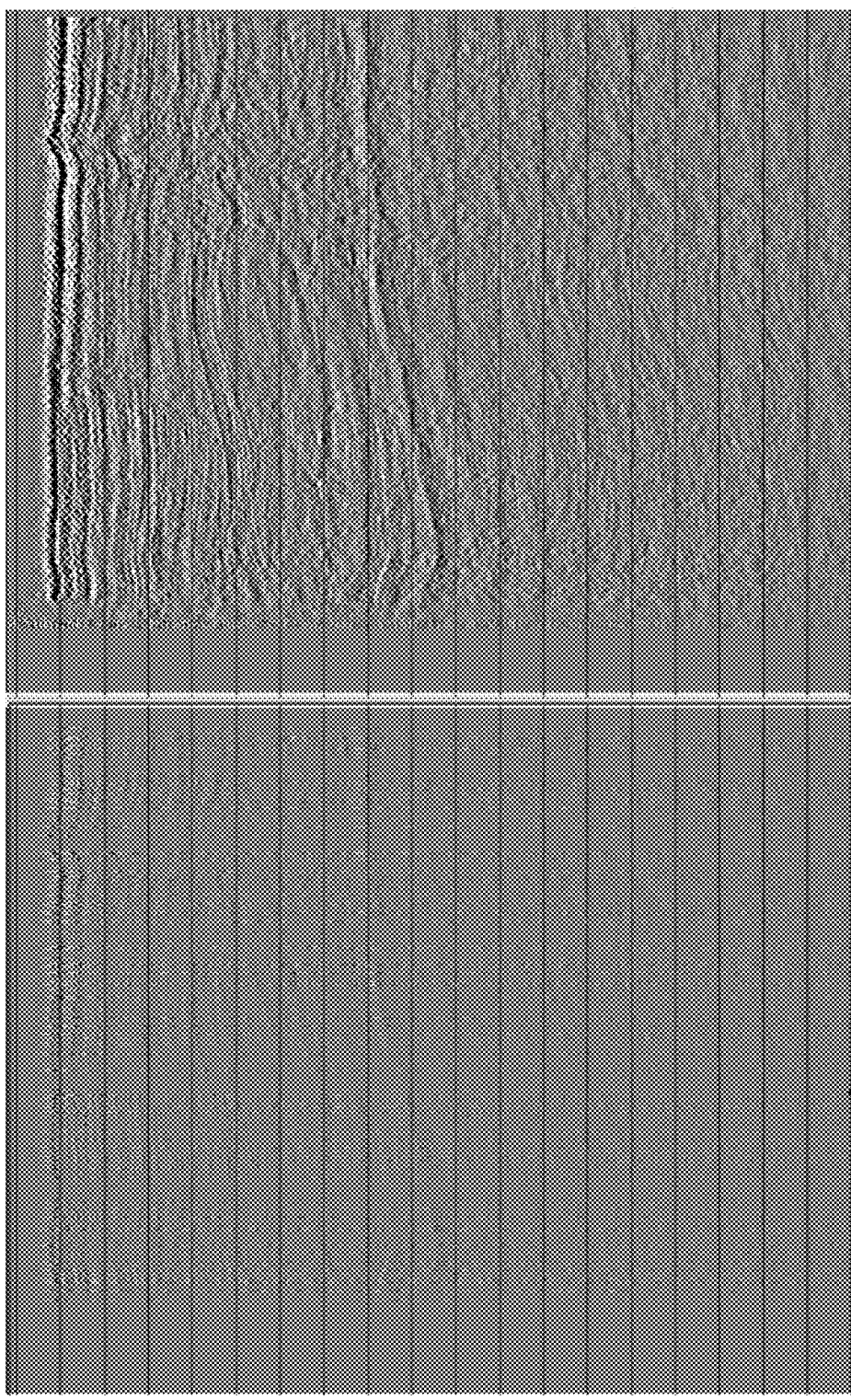
FIG. 4 shows an irregularly sampled input dataset and the result of performing an embodiment of the present invention.
Figure 5:
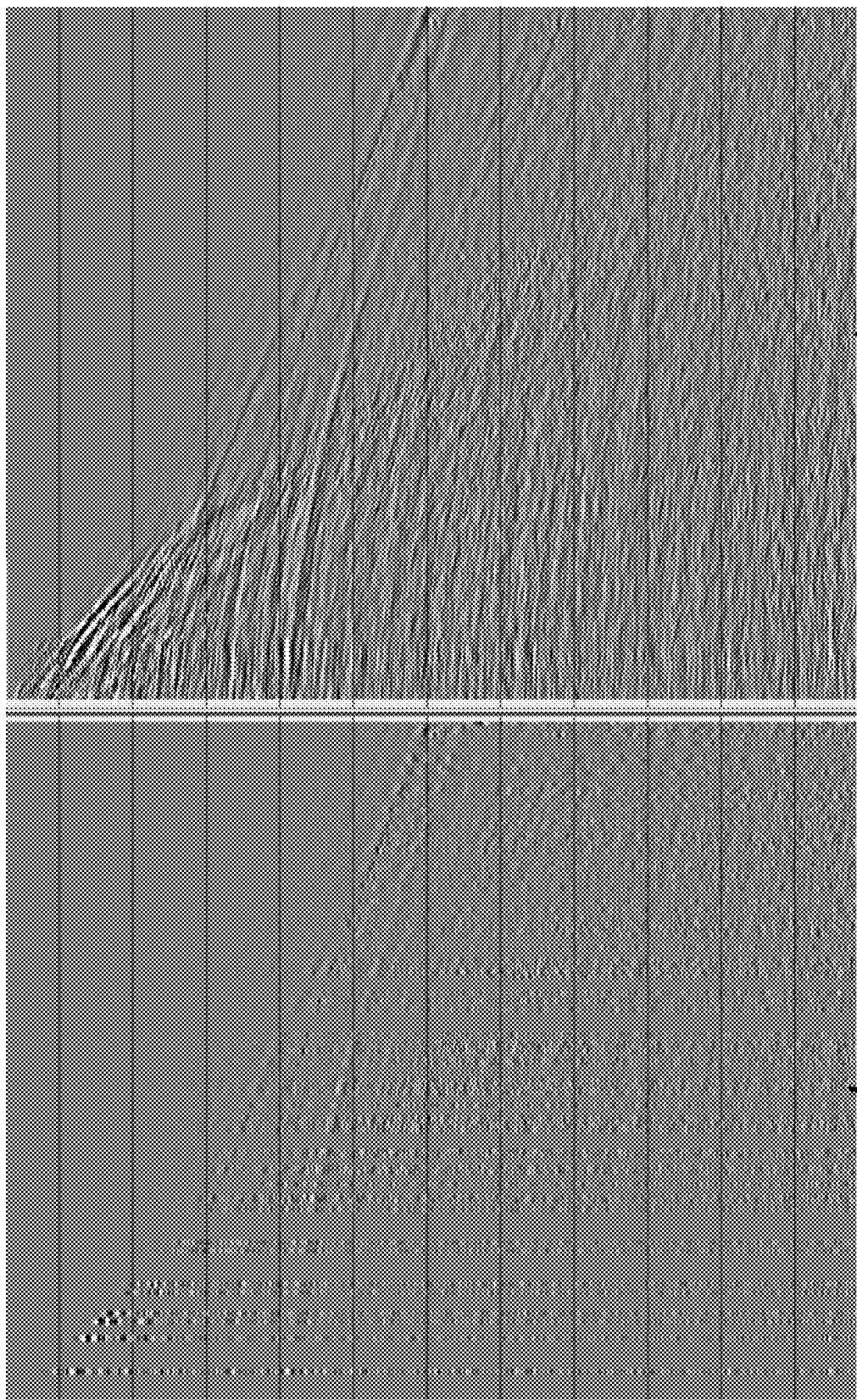
FIG. 5 shows another irregularly sampled input dataset and the result of performing an embodiment of the present invention.

Examples of the result of method 100 may be seen in FIGS. 4 and 5. In FIG. 4, an irregularly sampled crossline 40 was part of the seismic dataset input to the method 100. The regularly sampled crossline 42 was generated as part of method 100. In FIG. 5, an irregularly sampled common depth point (CDP) gather 50 was part of the seismic dataset input and the regularly sampled CDP gather 52 was generated by the present invention.

Although the embodiment of the invention shown in FIG. 1 illustrates the operations being performed in a particular sequence, this is not meant to be limiting. Some operations may be performed in parallel or in a different order. Other processing algorithms may also be included at various points in the workflow.

Figure 6:
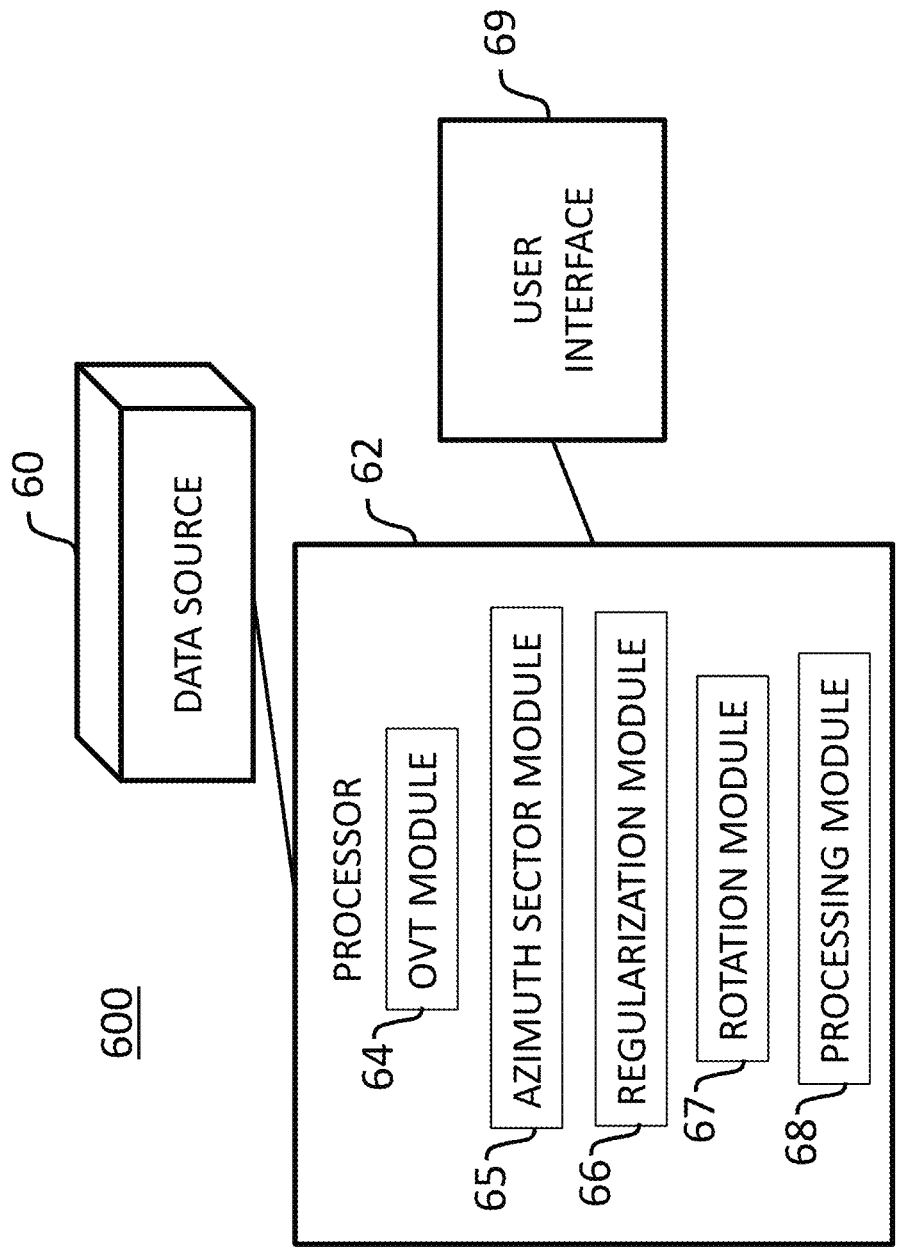
FIG. 6 schematically illustrates a system for performing a method in accordance with an embodiment of the invention.

A system 600 for performing the method 100 of FIG. 1 is schematically illustrated in FIG. 6. The system includes a data source/storage device 60 which may include, among others, a data storage device or computer memory. The data source/storage device 60 may contain recorded seismic data, synthetic seismic data, or signal or noise models. The data from data source/storage device 60 may be made available to a processor 62, such as a programmable general purpose computer. The processor 62 is configured to execute computer modules that implement method 100. These computer modules may include an OVT module 64 for mapping traces of an irregularly sampled seismic dataset into offset vector tiles (OVTs) which may be single-fold with similar offsets and azimuths. They may also include an azimuth sector module 65 for assembling azimuth sectors with a narrow azimuth range and an offset range of interest. Other modules may include a rotation module 67 for rotating the azimuth sectors as needed for operations in method 100, a regularization module 66 for regularizing a rotated azimuth sector, and a processing module 68 for other processing steps. The system may include interface components such as user interface 69. The user interface 69 may be used both to display data and processed data products and to allow the user to select among options for implementing aspects of the method. By way of example and not limitation, the irregularly sampled seismic data, the OVTs, the azimuth sectors, and/or the regularly sampled seismic data computed on the processor 62 may be displayed on the user interface 69, stored on the data storage device or memory 60, or both displayed and stored.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention. In addition, it should be appreciated that structural features or method steps shown or described in any one embodiment herein can be used in other embodiments as well.

What is claimed is:

1. A computer-implemented method for characterizing a subsurface volume of interest from an irregularly sampled seismic dataset, the method comprising:
    a. receiving, at a computer processor, the irregularly sampled seismic dataset with at least five dimensions including a first spatial dimension, a second spatial dimension, an offset dimension, an azimuth dimension, and a time or depth dimension;
    b. assigning, by the computer processor, each trace of the irregularly sampled seismic dataset to a representative bin;
    c. Mapping, by the computer processor, each of the traces of the irregularly sampled seismic dataset to an offset vector tile (OVT) with a calculated center azimuth;
    d. assembling, by the computer processor, an azimuth sector with all offsets of interest and a narrow range of the center azimuths from the OVTs;
    e. rotating, by the computer processor, the azimuth sector from an original orientation to align the first spatial dimension and the second spatial dimension with an inline direction and a crossline dimension determined from a seismic acquisition geometry for the irregularly sampled seismic dataset;
    f. selecting, by the computer processor, a subset of traces from the rotated azimuth sector based on a single crossline value to create an irregular 3D volume;
    g. regularizing, by the computer processor, the irregular 3D volume;
    h. repeating operations (f) and (g) for all crossline values to generate a regularly sampled azimuth sector;
    i. rotating, by the computer processor, the regularly sampled azimuth sector back to the original orientation;
    j. repeating operations (d)-(i) for all azimuth sectors to transform the irregularly sampled seismic dataset to a regularly sampled seismic dataset; and
    k. processing, by the computer processor, the regularly sampled seismic dataset to characterize the subsurface volume of interest.

2. The method of claim 1 wherein the regularizing is accomplished by interpolation.

3. The method of claim 1 wherein the narrow range of the center azimuths comprises a range of 45 degrees or less.

4. The method of claim 1 wherein the offsets of interest include all offsets.

5. The method of claim 1 wherein the irregularly sampled seismic dataset was acquired with irregular acquisition geometry.

6. The method of claim 1 wherein the processing is tomography.

7. The method of claim 2 wherein the regularizing and interpolation is done with an anti-leakage Fourier interpolation.

8. The method of claim 5 wherein the irregular acquisition geometry includes coil shooting.

9. An article of manufacture including a non-transitory computer readable medium having computer readable code on it, the computer readable code being configured to implement a method for characterizing a subsurface volume of interest from an irregularly sampled seismic dataset, the method comprising:
    a. receiving, at a computer processor, the irregularly sampled seismic dataset with at least five dimensions including a first spatial dimension, a second spatial dimension, an offset dimension, an azimuth dimension, and a time or depth dimension;
    b. assigning each trace of the irregularly sampled seismic dataset to a representative bin;
    c. mapping each of the traces of the irregularly sampled seismic dataset to an offset vector tile (OVT) with a calculated center azimuth;
    d. assembling an azimuth sector with all offsets of interest and a narrow range of the center azimuths from the OVTs;
    e. rotating the azimuth sector from an original orientation to align the first spatial dimension and the second spatial dimension with an inline direction and a crossline dimension determined from a seismic acquisition geometry for the irregularly sampled seismic dataset;
    f. selecting a subset of traces from the rotated azimuth sector based on a single crossline value to create an irregular 3D volume;

g. regularizing the irregular 3D volume;
h. repeating operations (f) and (g) for all crossline values to generate a regularly sampled azimuth sector;
i. rotating the regularly sampled azimuth sector back to the original orientation;
j. repeating operations (d)-(i) for all azimuth sectors to transform the irregularly sampled seismic dataset to a regularly sampled seismic dataset; and
k. processing the regularly sampled seismic dataset to characterize the subsurface volume of interest.

* * * * *